(12) United States Patent
Wen

(10) Patent No.: US 10,336,901 B2
(45) Date of Patent: Jul. 2, 2019

(54) POLYCARBONATE COMPOSITIONS, METHODS OF THEIR MANUFACTURE, AND ARTICLES THEREOF

(71) Applicant: SABIC GLOBAL TECHNOLOGIES B.V., Bergen Op Zoom (NL)

(72) Inventor: Liang Wen, Shanghai (CN)

(73) Assignee: SABIC Global Technologies B.V., Bergen Op Zoom (NL)

(*) Notice: Subject to any disclaimer, the term of this patent is extended or adjusted under 35 U.S.C. 154(b) by 0 days.

(21) Appl. No.: 15/126,619

(22) PCT Filed: Mar. 11, 2015

(86) PCT No.: PCT/IB2015/051781
§ 371 (c)(1),
(2) Date: Sep. 16, 2016

(87) PCT Pub. No.: WO2015/140671
PCT Pub. Date: Sep. 24, 2015

(65) Prior Publication Data
US 2017/0081512 A1    Mar. 23, 2017

Related U.S. Application Data

(60) Provisional application No. 61/955,839, filed on Mar. 20, 2014.

(51) Int. Cl.
| | |
|---|---|
| C08L 69/00 | (2006.01) |
| C08L 83/04 | (2006.01) |
| C08K 5/42 | (2006.01) |
| C08G 77/04 | (2006.01) |
| C08G 77/00 | (2006.01) |

(52) U.S. Cl.
CPC .............. C08L 69/00 (2013.01); C08L 83/04 (2013.01); *C08G 77/045* (2013.01); *C08G 77/80* (2013.01); *C08K 5/42* (2013.01); *C08L 2201/02* (2013.01); *C08L 2201/08* (2013.01); *C08L 2201/10* (2013.01); *C08L 2205/02* (2013.01)

(58) Field of Classification Search
CPC ............................ C08L 69/00; C08L 2205/02
See application file for complete search history.

(56) References Cited

U.S. PATENT DOCUMENTS

| | | |
|---|---|---|
| 3,971,756 A | 7/1976 | Bialous et al. |
| 4,028,297 A | 6/1977 | Webb |
| 4,110,299 A | 8/1978 | Mark |
| 4,130,530 A | 12/1978 | Mark et al. |
| 4,303,575 A | 12/1981 | Reinert |
| 4,335,038 A | 6/1982 | Thomas |
| 4,384,076 A * | 5/1983 | Ohara ...................... C08L 69/00 525/67 |
| 4,552,911 A | 11/1985 | Cohnen et al. |
| 4,916,194 A | 4/1990 | Policastro et al. |
| 5,218,027 A | 6/1993 | Smith et al. |
| 5,508,323 A | 4/1996 | Romenesko et al. |
| 6,462,111 B1 | 10/2002 | Singh et al. |
| 2002/0120044 A1* | 8/2002 | Blackburn .............. C08L 69/00 524/161 |
| 2005/0148719 A1* | 7/2005 | An .......................... C08L 69/00 524/462 |
| 2006/0084748 A1 | 4/2006 | Gallucci et al. |
| 2007/0191519 A1 | 8/2007 | Jiao et al. |
| 2011/0269882 A1 | 11/2011 | Kurokawa et al. |
| 2012/0059098 A1 | 3/2012 | Monden et al. |

FOREIGN PATENT DOCUMENTS

| | | | |
|---|---|---|---|
| EP | 2471854 A1 | 7/2012 | |
| JP | 2000327899 A * | 11/2000 | |
| WO | 01083606 A | 8/2011 | |
| WO | 2012065292 A1 | 5/2012 | |
| WO | WO 2012065292 A1 * | 5/2012 | .............. C08L 69/00 |

OTHER PUBLICATIONS

Long et al (Molding polycarbonate: Moisture degradation effect on physical and chemical properties, Polymer Engineering & Science, vol. 14, Issue 12, Dec. 1974, pp. 817-822).*
Machine translation of JP-2000327899-A. (Year: 2000).*
International Search Report for International Application No. PCT/IB2015/051781, International Application filing date: Mar. 11, 2015, dated Jun. 29, 2015, 5 pages.
Underwriter's Laboratory Bulletin 94, "Tests for Flammability of Plastic Materials for Parts in Devices and Appliances" (ISBN 0-7629-0082-2), Fifth Edition, Dated Oct. 29, 1996, incorporating revisions through and including Dec. 12, 2003; 52 pages.
Written Opinion for International Application No. PCT/IB2015/051781, International Application filing date: Mar. 11, 2015, dated Jun. 29, 2015, 5 pages.
Notice of Grounds for Cancelling Patent Registration from the Intellectual Property Trial and Appeal Board (IPTAB) in Korea; dated Jul. 24, 2018; English Translation.

* cited by examiner

*Primary Examiner* — Wenwen Cai
(74) *Attorney, Agent, or Firm* — Cantor Colburn LLP

(57) ABSTRACT

A polycarbonate composition having a flammability rating of V0 measured according to the UL 94 Vertical Burning Test at a thickness of 3 millimeters is disclosed. The composition comprises a linear polycarbonate, a branched polycarbonate, sodium dodecylbenzenesulfonate, and a linear phenyl-containing siloxane, a cyclic siloxane or a combination comprising at least one of the foregoing siloxanes.

14 Claims, 1 Drawing Sheet

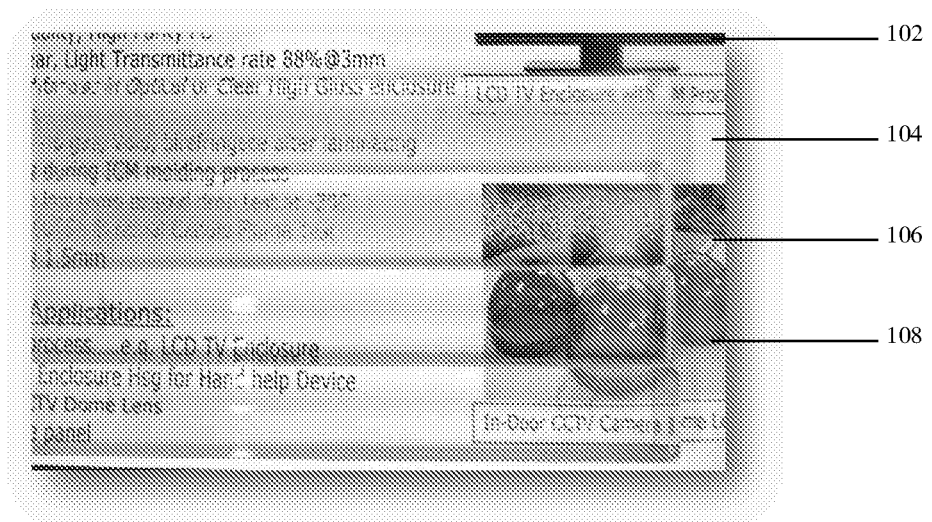

POLYCARBONATE COMPOSITIONS, METHODS OF THEIR MANUFACTURE, AND ARTICLES THEREOF

CROSS REFERENCE TO RELATED APPLICATIONS

This application is a National Stage application of PCT/IB15/51781, filed Mar. 11, 2015, which claims the benefit of U.S. Provisional Application No. 61/955,839, filed Mar. 20, 2014, both of which are incorporated by reference in their entirety herein.

BACKGROUND

This disclosure relates to polycarbonate compositions, their methods of manufacture, and articles thereof.

Polycarbonates are useful in a wide variety of applications at least in part due to their good balance of properties, such as moldability, heat resistance and impact properties among others. Additives have been added to polycarbonate compositions to improve their flame retardant properties, in particular dripping during burning. However, the use of these additives can compromise the desirable properties of the polycarbonates. For example, the additives can reduce the transparency of the polycarbonate compositions or render the polycarbonate compositions brittle. The additives can also reduce the processability of polycarbonate compositions, for example, causing difficulty in compounding or producing bubbles in products. Therefore there remains a need for improved flame retardant polycarbonate compositions, especially for food grade applications. It would be a further advantage if such compositions could be manufactured to be colorless, or transparent, or both. It would be a still further advantage if the compositions had good processability, such that bubble-free articles could be readily manufactured from the polycarbonate compositions.

SUMMARY

Disclosed herein is a polycarbonate composition comprising: a linear polycarbonate, a branched polycarbonate, sodium dodecylbenzenesulfonate, and a siloxane component comprising a linear phenyl-containing siloxane, a cyclic siloxane, or a combination comprising at least one of the foregoing siloxanes; wherein the composition has a flammability rating of V0 measured according to the UL94 Vertical Burning Test at a thickness of 3 millimeters.

In an embodiment, a polycarbonate composition comprising, based on the total weight of the polycarbonate composition, 50 to 90 wt. % of a linear polycarbonate comprising bisphenol A carbonate units, 10 to 50 wt. % of a branched polycarbonate comprising bisphenol A carbonate units, 0.005 to 2 wt. % of sodium dodecylbenzenesulfonate, 0.1 to 0.8 wt. % of a linear phenyl-containing siloxane, and 0.1 to 0.8 wt. % of a cyclic siloxane, wherein the composition has a flammability rating of V0 measured according to the UL94 Vertical Burning Test at a thickness of 3 millimeters.

In another embodiment, a method of manufacture comprises combining the above-described components to form a polycarbonate composition.

In yet another embodiment, an article comprises the above-described polycarbonate composition.

In still another embodiment, a method of manufacture of an article comprises molding, extruding, or shaping the above-described polycarbonate composition into an article.

The above described and other features are exemplified by the following Detailed Description, Examples, and FIGURE.

BRIEF DESCRIPTION OF THE DRAWINGS

The FIGURE is exemplary and not limiting.

The FIGURE compares flexural bars 102, 104 made from a composition containing Rimar salt and flexural bars 106, 108 made from a composition a composition containing sodium dodecylbenzenesulfonate (SDBS).

DETAILED DESCRIPTION

The inventors hereof have discovered that polycarbonate compositions having excellent flame retardant properties can unexpectedly be obtained by combining a linear polycarbonate, a branched polycarbonate, sodium dodecylbenzenesulfonate, and a siloxane component comprising a phenyl-containing linear siloxane, a phenyl-containing cyclic siloxane, or a combination comprising at least one of the foregoing siloxanes. The polycarbonate compositions can have a flammability rating of V0 measured according to the UL 94 Vertical Burning Test at a thickness of 2 millimeters. Unlike compositions containing flame retardants such as potassium perfluorobutane sulfonate (known as "Rimar salt"), which can cause bubbles during manufacture of articles, the polycarbonate compositions of the disclosure can be used to produce bubble-free articles. In addition, the polycarbonate compositions can produce products deemed to be safe for use in food contact applications in certain jurisdictions, because these compositions can achieve good flammability rating without the use of flame retardants such as Rimar salt, potassium diphenylsulfone sulfonate, or the sodium salt of toluene sulfonic acid, which are considered not suitable for use in food contact applications. Further, the polycarbonate compositions can have higher transparency and lower haze as compared to compositions containing Rimar salt. As a further advantageous feature, the polycarbonate compositions are halogen free, and thus environmentally friendly.

Accordingly, provided herein is a polycarbonate composition comprising a linear polycarbonate, a branched polycarbonate, sodium dodecylbenzenesulfonate, and a siloxane component comprising a phenyl-containing linear siloxane, a phenyl-containing cyclic siloxane, or a combination comprising at least one of the foregoing siloxanes.

The linear and the branched polycarbonate can comprise repeating structural carbonate units of formula (1)

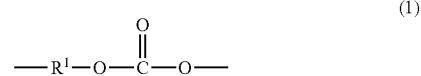

in which at least 1%, at least 10%, at least 50%, or at least 75% of the total number of $R^1$ groups are derived from 2,2-bis(4-hydroxyphenyl) propane ("bisphenol A" or "BPA"). The remaining $R^1$ groups are aromatic, that is, contain contains at least one $C_{6-30}$ aromatic moiety. Specifically, each of the remaining $R^1$ can be derived from a dihydroxy compound such as an aromatic dihydroxy compound of formula (2) or a bisphenol of formula (3).

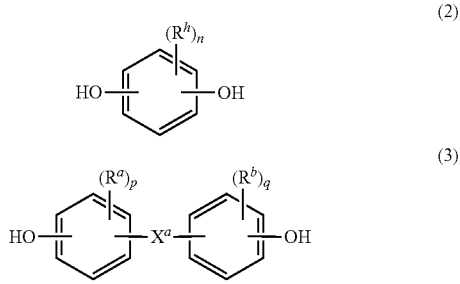

In formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl; and p and q are each independently integers of 0 to 4, such that when p or q is less than 4, the valence of each carbon of the ring is filled by hydrogen. In an embodiment, p and q is each 0, or p and q is each 1, and $R^a$ and $R^h$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Some illustrative examples of specific dihydroxy compounds other than bisphenol A include the following: bisphenol compounds such as 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis (4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis (4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3, 5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Specific dihydroxy compounds other than bisphenol A include resorcinol, 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane (DMBPC), and from bisphenol A and 1,1-bis(4-hydroxy-3-methylphenyl)-3,3,5-trimethylcyclohexane (isophorone bisphenol).

"Polycarbonate" as used herein also includes copolymers comprising carbonate units and ester units ("poly(estercarbonate)s", also known as polyester-polycarbonates). Poly (ester-carbonate)s further contain, in addition to recurring carbonate units of formula (1), repeating ester units of formula (4)

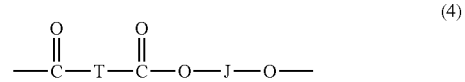

wherein J is a divalent group derived from a dihydroxy compound (which includes a reactive derivative thereof), and can be, for example, a $C_{2-10}$ alkylene, a $C_{6-20}$ cycloalkylene a $C_{6-20}$ arylene, or a polyoxyalkylene group in which the alkylene groups contain 2 to 6 carbon atoms, specifically, 2, 3, or 4 carbon atoms; and T is a divalent group derived from a dicarboxylic acid (which includes a reactive derivative thereof), and can be, for example, a $C_{2-20}$ alkylene, a $C_{6-20}$ cycloalkylene, or a $C_{6-20}$ arylene. Copolyesters containing a combination of different T and/or J groups can be used. The polyester units can be branched or linear.

Specific dihydroxy compounds include aromatic dihydroxy compounds of formula (2) (e.g., resorcinol), bisphenols of formula (3) (e.g., bisphenol A), a $C_{1-8}$ aliphatic diol such as ethane diol, n-propane diol, 1,4-butane diol, 1,6-cyclohexane diol, 1,6-hydroxymethylcyclohexane, or a combination comprising at least one of the foregoing dihydroxy compounds. Aliphatic dicarboxylic acids that can be used include $C_{6-20}$ aliphatic dicarboxylic acids (which includes the terminal carboxyl groups), specifically linear $C_{8-12}$ aliphatic dicarboxylic acid such as decanedioic acid (sebacic acid); and alpha, omega-$C_u$ dicarboxylic acids such as dodecanedioic acid (DDDA). Aromatic dicarboxylic acids that can be used include terephthalic acid, isophthalic acid, naphthalene dicarboxylic acid, 1,6-cyclohexane dicarboxylic acid, or a combination comprising at least one of the foregoing acids. A combination of isophthalic acid and terephthalic acid wherein the weight ratio of isophthalic acid to terephthalic acid is 91:9 to 2:98 can be used.

Specific ester units include ethylene terephthalate units, n-propylene terephthalate units, n-butylene terephthalate units, ester units derived from isophthalic acid, terephthalic acid, and resorcinol (ITR ester units), and ester units derived from sebacic acid and bisphenol A. The molar ratio of ester units to carbonate units in the poly(ester-carbonate)s can vary broadly, for example 1:99 to 99:1, specifically, 10:90 to 90:10, more specifically, 25:75 to 75:25, or from 2:98 to 15:85.

In a specific embodiment, the polycarbonate is a homopolymer containing bisphenol A carbonate units (BPA-PC). A specifically mentioned linear polycarbonate is a linear bisphenol A homopolycarbonate, and a specifically mentioned branched polycarbonate is a branched, cyanophenyl endcapped bisphenol A homopolycarbonate produced via interfacial polymerization, containing 3 mol % 1,1,1-tris(4-hydroxyphenyl)ethane (THPE) branching agent, commercially available under the trade name CFR from the Innovative Plastics division of SABIC.

Other specific polycarbonates that can be used include a poly(carbonate-siloxane) comprising bisphenol A carbonate units and siloxane units, for example blocks containing 5 to 200 dimethylsiloxane units, such as those commercially available under the trade name EXL from the Innovative Plastics division of SABIC, poly(ester-carbonate)s comprising bisphenol A carbonate units and isophthalate-terephthalate-bisphenol A ester units, also commonly referred to as poly(carbonate-ester)s (PCE) poly(phthalate-carbonate)s (PPC) depending on the relative ratio of carbonate units and ester units. Poly(aliphatic ester-carbonate)s can be used, such as those comprising bisphenol A carbonate units and sebacic acid-bisphenol A ester units, such as those commercially available under the trade name LEXAN HFD from the Innovative Plastics division of SABIC. Other specific copolycarbonate includes bisphenol A and bulky bisphenol carbonate units, i.e., derived from bisphenols containing at least 12 carbon atoms, for example 12 to 60 carbon atoms or 20 to 40 carbon atoms. Examples of such copolycarbonates include copolycarbonates comprising bisphenol A carbonate units and 2-phenyl-3,3'-bis(4-hydroxyphenyl) phthalimidine carbonate units (a BPA-PPPBP copolymer), a copolymer comprising bisphenol A carbonate units and 1,1-bis(4-hydroxy-3-methylphenyl)cyclohexane carbonate units (a BPA-DMBPC copolymer), and a copolymer comprising bisphenol A carbonate units and isophorone bisphenol carbonate units (available, for example, under the trade name APEC from Bayer).

Polycarbonates and poly(ester-carbonate)s can be manufactured by processes such as interfacial polymerization and melt polymerization. Although the reaction conditions for interfacial polymerization can vary, an exemplary process generally involves dissolving or dispersing a dihydroxy compound in aqueous NaOH or KOH, adding the resulting mixture to a water-immiscible solvent, and contacting the reactants with a carbonate precursor in the presence of a catalyst such as, for example, a tertiary amine or a phase transfer catalyst, under controlled pH conditions, e.g., 8 to 10.

The water-immiscible solvent can be, for example, methylene chloride, 1,2-dichloroethane, chlorobenzene, toluene, and the like.

Exemplary carbonate precursors include a carbonyl halide such as carbonyl bromide or carbonyl chloride (phosgene) a bishaloformate of a dihydroxy compound (e.g., the bischloroformate of bisphenol A, hydroquinone ethylene glycol, neopentyl glycol, or the like), and diaryl carbonates. Combinations comprising at least one of the foregoing types of carbonate precursors can also be used. The diaryl carbonate ester can be diphenyl carbonate, or an activated diphenyl carbonate having electron-withdrawing substituents on the each aryl, such as bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing.

In the manufacture of poly(ester-carbonate)s by interfacial polymerization, rather than using the dicarboxylic acid or diol directly, the reactive derivatives of the diacid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used.

Among tertiary amines that can be used as catalysts in interfacial polymerization are aliphatic tertiary amines such as triethylamine and tributylamine, cycloaliphatic tertiary amines such as N,N-diethyl-cyclohexylamine, and aromatic tertiary amines such as N,N-dimethylaniline. Among the phase transfer catalysts that can be used are catalysts of the formula $(R^3)_4Q^+X$, wherein each $R^3$ is the same or different, and is a $C_{1-10}$ alkyl; Q is a nitrogen or phosphorus atom; and X is a halogen atom or a $C_{1-8}$ alkoxy or $C_{6-18}$ aryloxy. Exemplary phase transfer catalysts include $(CH_3(CH_2)_3)_4$ NX, $(CH_3(CH_2)_3)_4PX$, $(CH_3(CH_2)_5)_4NX$, $(CH_3(CH_2)_6)_4$ NX, $(CH_3(CH_2)_4)_4NX$, $CH_3(CH_3(CH_2)_3)_3NX$, and $CH_3$ $(CH_3(CH_2)_2)_3NX$, wherein X is Cl$^-$, Br$^-$, a $C_{1-8}$ alkoxy or a $C_{6-18}$ aryloxy. An effective amount of a phase transfer catalyst can be 0.1 to 10 wt %, or 0.5 to 2 wt %, each based on the weight of dihydroxy compound in the phosgenation mixture.

Alternatively, melt processes can be used to make the polycarbonates. Generally, in the melt polymerization process, polycarbonates can be prepared by co-reacting, in a molten state, a dihydroxy reactant and a diaryl carbonate ester in the presence of a transesterification catalyst. The reaction may be carried out in typical polymerization equipment, such as a continuously stirred reactor (CSTR), plug flow reactor, wire wetting fall polymerizers, free fall polymerizers, wiped film polymerizers, BANBURY mixers, single or twin screw extruders, or a combination of the foregoing. Volatile monohydric phenol is removed from the molten reactants by distillation and the polymer is isolated as a molten residue. Melt polymerization may be conducted as a batch process or as a continuous process. In either case, the melt polymerization conditions used may comprise two or more distinct reaction stages, for example, a first reaction stage in which the starting dihydroxy aromatic compound and diaryl carbonate are converted into an oligomeric polycarbonate and a second reaction stage wherein the oligomeric polycarbonate formed in the first reaction stage is converted to high molecular weight polycarbonate. Such "staged" polymerization reaction conditions are especially suitable for use in continuous polymerization systems wherein the starting monomers are oligomerized in a first reaction vessel and the oligomeric polycarbonate formed therein is continuously transferred to one or more downstream reactors in which the oligomeric polycarbonate is converted to high molecular weight polycarbonate. Typically, in the oligomerization stage the oligomeric polycarbonate produced has a number average molecular weight of 1,000 to 7,500 Daltons. In one or more subsequent polymerization stages, the number average molecular weight (Mn) of the polycarbonate is increased to between 8,000 and 25,000 Daltons (using polycarbonate standard). Typically, solvents are not used in the process, and the reactants dihydroxy aromatic compound and the diaryl carbonate are in a molten state. The reaction temperature can be 100° C. to 350° C., specifically 180° C. to 310° C. The pressure may be at atmospheric pressure, supra-atmospheric pressure, or a range of pressures from atmospheric pressure to 15 torr in the initial stages of the reaction, and at a reduced pressure at later stages, for example 0.2 to 15 torr. The reaction time is generally 0.1 hours to 10 hours.

Catalysts used in the melt transesterification polymerization production of polycarbonates can include alpha or beta catalysts. Beta catalysts are typically volatile and degrade at elevated temperatures. Beta catalysts are therefore preferred for use at early low-temperature polymerization stages. Alpha catalysts are typically more thermally stable and less volatile than beta catalysts.

The alpha catalyst can comprise a source of alkali or alkaline earth ions. The sources of these ions include alkali metal hydroxides such as lithium hydroxide, sodium hydroxide, and potassium hydroxide, as well as alkaline earth hydroxides such as magnesium hydroxide and calcium hydroxide. Other possible sources of alkali and alkaline earth metal ions include the corresponding salts of carboxylic acids (such as sodium acetate) and derivatives of ethylene diamine tetraacetic acid (EDTA) (such as EDTA tetrasodium salt, and EDTA magnesium disodium salt). Other alpha transesterification catalysts include alkali or alkaline earth metal salts of carbonate, such as $Cs_2CO_3$, $NaHCO_3$, and $Na_2CO_3$, and the like, non-volatile inorganic acid such as $NaH_2PO_3$, $NaH_2PO_4$, $Na_2HPO_3$, $KH_2PO_4$, $CsH_2PO_4$, $Cs_2HPO_4$, and the like, or mixed salts of phosphoric acid, such as $NaKHPO_4$, $CsNaHPO_4$, $CsKHPO_4$, and the like. Combinations comprising at least one of any of the foregoing catalysts can be used.

Possible beta catalysts can comprise a quaternary ammonium compound, a quaternary phosphonium compound, or a combination comprising at least one of the foregoing. The quaternary ammonium compound can be a compound of the structure $(R^4)_4N^+X^-$, wherein each $R^4$ is the same or different, and is a $C_{1-20}$ alkyl, a $C_{4-20}$ cycloalkyl, or a $C_{4-20}$ aryl; and $X^-$ is an organic or inorganic anion, for example a hydroxide, halide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising at least one of the foregoing. Tetramethyl ammonium hydroxide is often used. The quaternary phosphonium compound can be a compound of the structure $(R^5)_4P^+X^-$, wherein each $R^5$ is the same or different, and is a $C_{1-20}$ alkyl, a $C_{4-20}$ cycloalkyl, or a $C_{4-20}$ aryl; and $X^-$ is an organic or inorganic anion, for example a hydroxide, phenoxide, halide, carboxylate such as acetate or formate, sulfonate, sulfate, formate, carbonate, or bicarbonate. Where $X^-$ is a polyvalent anion such as carbonate or sulfate it is understood that the positive and negative charges in the quaternary ammonium and phosphonium structures are properly balanced. For example, where $R^{20}$ to $R^{23}$ are each methyls and $X^-$ is carbonate, it is understood that $X^-$ represents $2(CO_3^{-2})$. Examples of organic quaternary phosphonium compounds include tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate, tetraphenyl phosphonium phenoxide, and combinations comprising at least one of the foregoing. TBPA is often used.

The amount of alpha and beta catalyst used can be based upon the total number of moles of dihydroxy compound used in the polymerization reaction. When referring to the ratio of beta catalyst, for example, a phosphonium salt, to all dihydroxy compounds used in the polymerization reaction, it is convenient to refer to moles of phosphonium salt per mole of the dihydroxy compound, meaning the number of moles of phosphonium salt divided by the sum of the moles of each individual dihydroxy compound present in the reaction mixture. The alpha catalyst can be used in an amount sufficient to provide $1\times10^{-2}$ to $1\times10^{-8}$ moles, specifically, $1\times10^{-4}$ to $1\times10^{-7}$ moles of metal per mole of the dihydroxy compounds used. The amount of beta catalyst (e.g., organic ammonium or phosphonium salts) can be $1\times10^{-2}$ to $1\times10^{-5}$, specifically $1\times10^{-3}$ to $1\times10^{-4}$ moles per total mole of the dihydroxy compounds in the reaction mixture. Quenching of the transesterification catalysts and any reactive catalysts residues with an acidic compound after polymerization is completed can also be useful in some melt polymerization processes. Removal of catalyst residues and/or quenching agent and other volatile residues from the melt polymerization reaction after polymerization is completed can also be useful in some melt polymerization processes.

An end-capping agent (also referred to as a chain stopper agent or chain terminating agent) can be included during polymerization to provide end groups. The end-capping agents (and thus end groups) are selected based on the desired properties of the polycarbonates. Exemplary end-capping agents are exemplified by monocyclic phenols such as phenol and $C_1$-$C_{22}$ alkyl-substituted phenols such as p-cumyl-phenol, resorcinol monobenzoate, and p- and tertiary-butyl phenol, monoethers of diphenols, such as p-methoxyphenol, and alkyl-substituted phenols with branched chain alkyl substituents having 8 to 9 carbon atoms, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, mono-carboxylic acid chlorides such as benzoyl chloride, $C_1$-$C_{22}$ alkyl-substituted benzoyl chloride, toluoyl chloride, bromobenzoyl chloride, cinnamoyl chloride, and 4-nadimidobenzoyl chloride, polycyclic, mono-carboxylic acid chlorides such as trimellitic anhydride chloride, and naphthoyl chloride, functionalized chlorides of aliphatic monocarboxylic acids, such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid.

It has been found that flame retardance is improved even further when a combination comprising a linear polycarbonate and a branched polycarbonate is used. As used herein, a "linear polycarbonate" refers to a polycarbonate manufactured via a melt or interfacial polymerization without the addition of a branching agent. As is known in the art, a branched polycarbonate species typically referred to as Fries product occurs as a result of catalyst addition and process conditions in a melt polymerization process. This polycarbonate is nonetheless considered a linear polycarbonate for purposes of this application. when no branching agent is added Branched polycarbonates, in contrast are manufactured by the addition of a branching agent as is known in the art and described in more detail below. For example, a melt polymerized polycarbonate process that adds a branching agent into the polymerization process qualifies as a branched polycarbonate In some embodiments, a particular type of branching agent is used to create branched polycarbonate materials. These branched polycarbonate materials have statistically more than two end groups. The branching agent is added in an amount (relative to the bisphenol monomer) that is sufficient to achieve the desired branching content, that is, more than two end groups. The molecular weight of the polymer may become very high upon addition of the branching agent, and to avoid excess viscosity during polymerization, an increased amount of a chain stopper agent can be used, relative to the amount used when the particular branching agent is not present. The amount of chain stopper used is generally above 5 mole percent and less than 20 mole percent compared to the bisphenol monomer.

Such branching agents include aromatic triacyl halides, for example triacyl chlorides of formula (5)

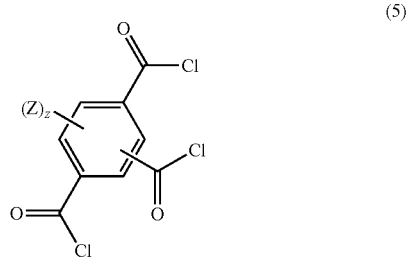

(5)

wherein Z is a halogen, $C_{1-3}$ alkyl, $C_{1-3}$ alkoxy, $C_{7-12}$ arylalkylene, $C_{7-12}$ alkylarylene, or nitro, and z is 0 to 3; a tri-substituted phenol of formula (6)

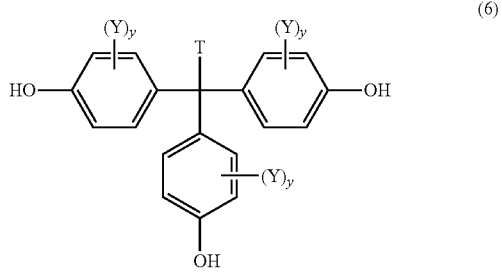

(6)

wherein T is a $C_{1-20}$ alkyl, $C_{1-20}$ alkoxy, $C_{7-12}$ arylalkyl, or $C_{7-12}$ alkylaryl, Y is a halogen, $C_{1-3}$ alkyl, $C_{1-3}$ alkoxy, $C_{7-12}$ arylalkyl, $C_{7-12}$ alkylaryl, or nitro, s is 0 to 4; or a compound of formula (7) (isatin-bis-phenol).

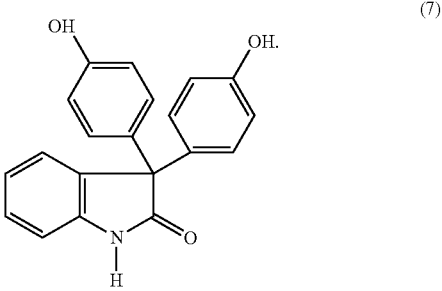 [SMILES: O=C1Nc2ccccc2C1(c1ccc(O)cc1)c1ccc(O)cc1]

(7)

Examples of specific branching agents that are particularly effective in the compositions include trimellitic trichloride (TMTC), tris-p-hydroxyphenylethane (THPE), and isatin-bis-phenol.

The amount of the branching agents used in the manufacture of the polycarbonate will depend on a number of considerations, for example the type of $R^1$ groups, the amount of chain stopper, e.g., cyanophenol, and the desired molecular weight of the polycarbonate. In general, the amount of branching agent is effective to provide 0.1 to 10 branching units per 100 unbranched carbonate units (1) ($R^1$ units), specifically 0.5 to 8 branching units per 100 $R^1$ units, and more specifically 0.75 to 5 branching units per 100 $R^1$ units. For branching agents having formula (5), the branching agent is present in an amount to provide 0.1 to 10 triester branching units per 100 $R^1$ units, specifically 0.5 to 8, and more specifically 0.75 to 5 triester branching units per 100 $R^1$ units. For branching agents having formula (21), the branching agent is present in an amount effective to provide 0.1 to 10 triphenyl carbonate branching units per 100 $R^1$ units, specifically 0.5 to 8, and more specifically 2.5 to 3.5 triphenylcarbonate units per 100 $R^1$ units. In some embodiments, a combination of two or more branching agents can be used. In some embodiments, a combination of two or more branching agents can be used. Alternatively, the branching agents can be added at a level of 0.05 to 2.0 wt. %.

In an embodiment, the branched polycarbonate comprises units (1) as described above; greater than or equal to 3 mole %, e.g., 3 to 10 mole %, based on the total moles of the polycarbonate, of moieties derived from a branching agent; and end-capping groups derived from an end-capping agent having a pKa between 8.3 and 11. The branching agent can comprise trimellitic trichloride, 1,1,1-tris(4-hydroxyphenyl)ethane or a combination of trimellitic trichloride and 1,1,1-tris(4-hydroxyphenyl)ethane, and the end-capping agent is phenol or a phenol containing a substituent of cyano group, aliphatic groups, olefinic groups, aromatic groups, halogens, ester groups, ether groups, or a combination comprising at least one of the foregoing. In a specific embodiment, the end-capping agent is phenol, p-t-butylphenol, p-methoxyphenol, p-cyanophenol, p-cumylphenol, or a combination comprising at least one of the foregoing.

The branched polycarbonate has a molecular weight of between 26,000 and 42,000 daltons.

The polycarbonate compositions can comprise 10 wt. % to 90 wt. %, 20 wt. % to 90 wt. %, or 30 to 90 wt. %, 40 wt. % to 90 wt. %, 50 wt. % to 90 wt. %, 55 wt. % to 85 wt. %, or 60 wt. % to 80 wt. % of the linear polycarbonate, and 10 wt. % to 90 wt. %, 10 wt. % to 80 wt. %, 10 wt. % to 70 wt. %, 10 wt. % to 60 wt. %, 10 wt. % to 50 wt. %, 15 wt. % to 45 wt. %, or 20 wt. % to 40 wt. % of the branched polycarbonate, each based on the total weight of the polycarbonate compositions. In an embodiment, the polycarbonate compositions comprise 60 wt. % to 80 wt. % of the linear polycarbonate and 20 wt. % to 40 wt. % of the branched polycarbonate, each based on the total weight of the polycarbonate compositions.

Flame-retardant, sodium dodecylbenzenesulfonate ("SDBS"), is incorporated into the polycarbonate compositions. The flame retardant is present in an amount of 0.01 to 2 weight percent, based on the weight of the polycarbonate compositions. Within this range, the flame retardant may be present in an amount greater than or equal to 0.015 or greater than or equal to 0.02 weight percent. Also within this range the flame retardant may be present in an amount less than or equal to 1.5, or less than or equal to 1.0 weight percent.

Various other types of flame-retardants can be optionally used as well. The polycarbonate composition can be essentially free of chlorine and bromine. Essentially free of chlorine and bromine refers to materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine can be defined as having a bromine and/or chlorine content of less than or equal to 100 parts per million by weight (ppm), less than or equal to 75 ppm, or less than or equal to 50 ppm. When this definition is applied to the fire retardant it is based on the total weight of the fire retardant. When this definition is applied to the polycarbonate composition, it is based on the total weight of the composition, excluding any filler.

In an embodiment, the flame retardant is sodium dodecylbenzenesulfonate and the polycarbonate composition is free of perfluoroalkane sulfonate alkali metal, $C_1$-$C_6$ alkylammonium, or ammonium salts, for example, the composition is free of potassium diphenylsulfone-3-sulfonate (KSS), potassium perfluorobutane-sulfonate (Rimar salt), potassium perfluoromethane-sulfonate or a combination comprising at least one of the foregoing.

A class of compounds that can be combined with the flame retardant additive is the class of cyclic siloxanes having the general formula $(R_3SiO)_y$ wherein each $R_3$ is the same or different, and is a monovalent hydrocarbon or a $C_{1-18}$ monovalent fluorinated hydrocarbon and y is 3 to 12. In an embodiment, each $R_3$ is the same and is a $C_{1-7}$ alkyl, $C_{1-7}$ fluorinated alkyl, $C_7$ arylalkylene, or phenyl. Examples of fluorinated hydrocarbon include, but are not limited to, 3-fluoropropyl, 3,3,3-trifluoropropyl, 5,5,5,4,4,3,3-heptafluoropentyl, fluorophenyl, difluorophenyl and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly mentioned cyclic siloxane is octaphenylcyclotetrasiloxane. The use of octaphenylcyclotetrasiloxane in combination with sodium dodecylbenzenesulfonate has been found to improve the flame performance and also to increase the transparency and reduce the haze of polycarbonate compositions.

Another class of compounds that can be combined with flame retardant sodium dodecylbenzenesulfonate with or without the presence of the cyclic siloxanes discussed above are poly(phenylalkylsiloxanes) where the alkyl group is a $C_{1-18}$ alkyl group. One specific example of a poly(phenylalkylsiloxane) is a poly(phenylmethylsiloxane) having the formula (8)

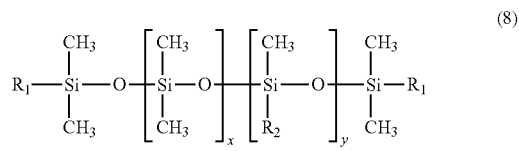

where $R_1$ is methyl and $R_2$ is phenyl and x and y are molar ratios that can vary in ratio but sum to 1. The presence of phenyl groups in the linear siloxane structure in general improves transparency and reduces haze in the polycarbonate formulation. Can you provide any more characteristics, for example a range of molecular weights or a range of viscosities? One such poly(phenylmethylsiloxane) is available commercially from Toshiba Silicone Co. LTD as TSF437. TSF437 is a liquid at room temperature (viscosity 22 centistokes at 25° C.) and so is particularly convenient to add to polycarbonate compositions Combining phenyl-containing cyclic siloxanes such as octaphenylcyclotetrasiloxane with phenyl containing linear siloxanes such as poly(phenylmethylsiloxane) with flame retardant additive sodium dodecylbenzenesulfonate has been found to be particularly effective in providing excellent flame performance and high impact performance while maintaining excellent transmittance and low haze in polycarbonate compositions.

When present, the cyclic siloxane and poly(phenylalkylsiloxanes) are present in amounts of greater than 0.1 wt. % respectively, based on the total weight of the polycarbonate compositions. In an embodiment, the compositions comprise between 0.1 wt. % and 0.8 wt. % cyclic siloxanes such as octaphenyl cyclotetrasiolxane and 0.1 wt. % to 0.8 wt. % poly(phenylalkylsiloxanes) such as poly(phenylmethylsiloxane), each based on the total weight of the compositions.

The polycarbonate compositions can optionally comprise 0.005 wt. % to 10 wt. %, 0.01 wt. % to 8 wt. %, 0.02 wt. % to 6 wt. %, 0.025 wt. % to 5 wt. % of water, based on the total weight of the composition. Water can be mixed with other components directly. Alternatively, water can be used to dissolve sodium dodecylbenzenesulfonate; then the SDBS solution can be mixed with other components of the polycarbonate composition. The presence of water can improve SDBS dispersion in the polycarbonate composition, improve transmission, and decrease haze.

The polycarbonate compositions can include various additives ordinarily incorporated in polycarbonate compositions, with the proviso that the additives are selected so as to not significantly adversely affect the desired properties of the polycarbonate, for example, transparency, and flame retardance. Combinations of additives can be used. Such additives can be mixed at a suitable time during the mixing of the components for forming the composition.

The additives can include an impact modifier, flow modifier, antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, anti-drip agent (e.g., a PTFE-encapsulated styrene-acrylonitrile copolymer (TSAN)), or a combination comprising one or more of the foregoing. For example, a combination of a heat stabilizer, mold release agent, and ultraviolet light stabilizer can be used. In general, the additives are used in the amounts generally known to be effective. For example, the total amount of the additive composition (other than any impact modifier, filler, or reinforcing agent) can be 0.001 to 10.0 wt %, or 0.01 to 5 wt %, each based on the total weight of the polymer in the composition.

Methods of forming the polycarbonate compositions can vary. For example, a linear polycarbonate, a branched polycarbonate, sodium dodecylbenzenesulfonate, siloxane additive, and/or other optional components are first blended in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric polymer and fed into the extruder. The extruder is generally operated at a temperature higher than that necessary to cause the composition to flow. The extrudate is immediately quenched in a water bath and pelletized. The pellets so prepared can be one-fourth inch long or less as desired. Such pellets can be used for subsequent molding, shaping, or forming.

The polycarbonate compositions can have a melt flow ratio (MFR) of 4 to 12, more specifically 5 to 10 g/10 minutes, measured at 300° C. under a load of 1.2 kg in accordance with ASTM D1238-04.

The polycarbonate compositions can further have a transmission of 85% or more and a haze of 3% or less, measured according to ASTM D1003 using the color space CIE1931 (Illuminant C and a 2° observer) at a thickness of 3 mm.

Flammability tests were performed following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003.

The polycarbonate compositions can further have a flame out time (FOT) at 3 mm of 15 to 50 seconds, 15 to 40 seconds, 20 to 40 seconds, or specifically 22 to 35 seconds.

The polycarbonate compositions can have a flammability rating of V-0 measured according to the UL 94 Vertical Burning Test at a thickness of 3 millimeters.

The polycarbonate compositions can further have a flammability rating of V-0 measured according to the UL 94 Vertical Burning Test at a thickness of 2 millimeters.

Shaped, formed, or molded articles comprising the polycarbonate compositions are also provided. The polycarbonate compositions can be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. The compositions are of particular utility in the manufacture of thin walled articles such as housings for electronic devices. Additional examples of articles that can be formed from the compositions include electrical parts, such as relays, and enclosures, consumer electronics such as enclosures and parts for laptops, desktops, docking stations, PDAs, digital cameras, desktops, telecommunications parts such as parts for base station terminals, liquid crystal display component, and products or parts for products for use in contact of food, such as food grade containers, coffee makers, juice extractors, and blenders, or parts for coffer makers, juice extractors, and blenders.

In some embodiments, an article of manufacture that contains the compositions encompassed by the disclosure is at least one of the following: a television, a light emitting diode, an electrical component, a liquid crystal display, a laptop computer, a smartphone, and a coffeemaker.

In another embodiment, the molded article can be an injected molded article or extruded molded article.

In a particularly useful embodiment, the articles comprising the polycarbonates are bubble-free as shown and described below in connection with the FIGURE. Most preferably, the bubble-free articles have no bubbles visible to the naked (unassisted) eye. In another embodiment, an article molded from the composition and having dimensions of 12.7 mm (0.500 inches)×127 mm (5.00 inches) and a thickness of 3.2 mm (0.125 inches) can have less than 20, less than 10, less than 5, or no bubbles visible to the naked eye.

The polycarbonate compositions are further illustrated by the following non-limiting examples.

EXAMPLES

The materials used in the Examples are described in Table 1. Unless specifically indicated otherwise, the amount of each component is in weight percent in the following examples, based on the total weight of the composition.

TABLE 1

| Component | Description | Source |
| --- | --- | --- |
| PC-1 | Linear BPA-polycarbonate, produced via interfacial polymerization, having a weight average Mw of about 29,900 Daltons as determined by GPC using polycarbonate standard | SABIC |
| PC-2 | Linear BPA-polycarbonate, produced via interfacial polymerization, having a weight average Mw of about 21,900 Daltons as determined by GPC using polycarbonate standard | SABIC |
| PC-3 | Linear BPA-polycarbonate, produced via melt polymerization, MFR (300° C., 1.2 kg) of 6 cm$^3$/10 min, having a weight average Mw of about 30,500 Daltons as determined by GPC using polycarbonate standard | SABIC |
| PC-4 | Linear BPA-polycarbonate, produced via melt polymerization, MFR (300° C., 1.2 kg) of 26 cm$^3$/10 min, having a weight average Mw of about 30,500 Daltons as determined by GPC using polycarbonate standard | SABIC |

TABLE 1-continued

| Component | Description | Source |
|---|---|---|
| PC-5 | Linear BPA-polycarbonate, produced via interfacial polymerization, having a weight average Mw of about 36,500 Daltons as determined by GPC using polycarbonate standard | SABIC |
| Branched PC | Branched BPA-polycarbonate, 1,1,1-tris(4-hydroxyphenyl)ethane (THPE) branching agent, produced via interfacial polymerization, having a weight average Mw of about 37,000 Daltons as determined by GPC using polycarbonate standard | SABIC |
| PETS | Pentaerythritol tetrastearate | FACI |
| KSS | Potassium diphenylsulfone-3-sulfonate | Sloss Industries Corporation |
| Si-1 | Polymethylphenylsiloxane | Momentive |
| Si-2 | Octaphenylcyclotetrasiloxane | Toshiba Silicone Co. |
| SDBS | Sodium dodecylbenzenesulfonate | Aldrich |

The components of polycarbonate compositions as described in Table 2 and 3 were blended using, e.g., a in a HENSCHEL-Mixer® high speed mixer. Extrusion of the blended compositions was performed on a TEM-37BS twin screw extruder having a screw design of L-3-1B. The extruder had 11 zones, which were set at temperatures of 50° C. (zone 1), 100° C. (zone 2), and 270° C. (zone 3 to 11). Screw speed was 400 rpm and throughput was 40 kg/hr.

Extruded pellets were dried in a dehumidifying dryer for 3 hours at 120° C. Different thickness of UL94 testing bars, i.e., 1.0 mm, 1.2 mm and 2.5 mm were molded with single gate tooling, and 0.3 mm, 0.4 mm bars were molded with film gate tooling. It will be recognized by one skilled in the art that the method is not limited to these temperatures or processing equipment.

Flammability tests were performed following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003. The samples were burned in a vertical orientation after aging for 48 hours at 23° C., 50% relative humidity or 168 hours at 70° C. The criteria for each of the flammability classifications tested are described below.

V0: In a sample placed so that its long axis is 180 degrees to the flame, the average period of flaming and/or smoldering after removing the igniting flame does not exceed five seconds and none of the vertically placed samples produces drips of burning particles that ignite absorbent cotton, and no specimen burns up to the holding clamp after flame or after glow. Five bars flame out time (FOT) is the sum of the flame out time for five bars each lit twice for ten (10) seconds each, for a maximum flame out time of 50 seconds.

V-1, V-2: In a sample placed so that its long axis is 180 degrees to the flame, the average period of flaming and/or smoldering after removing the igniting flame does not exceed twenty-five seconds and, for a V-1 rating, none of the vertically placed samples produces drips of burning particles that ignite absorbent cotton. The V2 standard is the same as V-1, except that flaming drips that ignite the cotton are permitted. Five bar flame out time (FOT) is the sum of the flame out time for five bars, each lit twice for ten (10) seconds each, for a maximum flame out time of 250 seconds.

The data were also analyzed by calculation of the average flame out time, standard deviation of the flame out time, as the total number of drips, and using statistical methods to convert that data to a prediction of the probability of first time pass, or "p(FTP)", that a particular sample formulation would achieve a V0 "pass" rating in the conventional UL94 testing of 5 bars. p(FTP) will be as close to 1 as possible, for example greater than 0.9 and more specifically greater than 0.95, for maximum flame-retardant performance in UL testing.

Drip means the total number of drips.

Melt flow rate (MFR) was determined at 300° C. under load of 1.2 kg according to ASTM D1238-04.

Transmission and haze were tested according to ASTM D1003 using the color space CIE1931 (Illuminant C and a 2° observer) at a thickness of 3 mm on HazeGard II.

Examples 1-5

Examples 1-5 demonstrate the effect of the addition of sodium dodecylbenzenesulfonate to polycarbonates (SDBS). Formulations and results are shown in Table 2.

TABLE 2

| Component | Unit | CEx1 | CEx2 | CEx3 | CEx4 | CEx5 |
|---|---|---|---|---|---|---|
| PETs | % | 0.2701 | 0.2701 | 0.2701 | 0.2701 | 0.27001 |
| PC-1 | % | 69.783 | 69.783 | | 69.783 | 69.783 |
| PC-2 | % | 29.907 | 29.907 | | 29.907 | 29.907 |
| KSS | % | 0.0399 | | | | |
| SDBS | % | | | | 0.02 | 0.1 |
| H$_2$O | % | | | | 0.1595 | 0.3 |
| PC-3 | % | | | 69.783 | | |
| PC-4 | % | | | 29.907 | | |
| Property | | | | | | |
| MFR, 300° C., 300 sec., 1.2 kg | g/10 min | 10 | 11.3 | 10.8 | 10.8 | 10.7 |
| V × 6 mm 23° C. 48 hr FOT | s | 15.1 | 125 | 193.5 | 10.4 | 10.7 |
| Drip | | 0 | 5 | 4 | 0 | 0 |
| Time out | | 0 | 0 | 4 | 0 | 0 |

TABLE 2-continued

| Component | | Unit | CEx1 | CEx2 | CEx3 | CEx4 | CEx5 |
|---|---|---|---|---|---|---|---|
| | p(FTP) | | 1 | 0 | 0 | 1 | 1 |
| | Rating | | V0 | V2 | Fail | V0 | V0 |
| 70° C. | FOT | s | 13.8 | 187.6 | 139.4 | 16.4 | 12.7 |
| 168 | Drip | | 0 | 3 | 4 | 0 | 0 |
| hr | Time out | | 0 | 3 | 3 | 0 | 0 |
| | p(FTP) | | 0 | 2 | 2 | 0.999 | 1 |
| | Rating | | V0 | Fail | Fail | V0 | V0 |

As shown in Table 2, when a flame retardant is not added (CEx2 and CEx3), the polycarbonates formulations do not pass the V0 test at 6 mm thickness. After SDBS (CEx4 and CEx5) or KSS (CEx1) are added, the polycarbonates pass V0 test at 6 mm thickness.

The compositions of both CEx4 (0.1% SDBS) and CEx5 (0.02 wt % SDBS) show the same flame retardant performance in V0 test at 6 mm thickness. Accordingly, the 0.02% SDBS loading is selected for further study.

Examples 6-13

Examples 6-13 demonstrate the effect of the addition of a branched polycarbonate to a combination of a linear polycarbonate, SDBS and siloxane additives. Formulations and results are shown in Table 3.

The results shown in Table 3 demonstrate that in the absence of a branched polycarbonate, combinations of linear polycarbonates, SDBS, and siloxane additives in various relative amounts all fail V0 test at 3.0 mm (CExs 6, 7, 8, and 9). However, when a branched polycarbonate is added, the compositions pass V0 test at 3 mm (Exs 10, 11, 12 and 13) and pass V2 (Ex 10 at 23° C.) or V0 test (Ex 10 at 70° C. and Exs 11-13) at 2 mm.

Also as shown in Table 3, the transmission of the compositions of Exs 11 and 13 are 90.6% and 88.6% and the haze of the compositions of Exs 11 and 13 are 1.2 and 2 respectively. The high transparency and low haze make these compositions highly suitable for the manufacture of transparent articles.

Further, as shown in the FIGURE, a large number of bubbles were observed in the samples 102, 104 molded from the composition containing potassium perfluorobutane sulfonate (Rimar salt). In contrast, the samples 106, 108 molded from the composition of Ex11 were clear and no bubbles were observed. Accordingly, a bubble-free transparent composition having V0 rating can be achieved. The bars shown in the FIGURE were molded for flexural modulus testing, and have dimensions of 12.7 mm (0.500 inches)× 127 mm (5.00 inches) and a thickness of 3.2 mm (0.125 inches).

TABLE 3

| Component | | Unit | CEx6 | CEx7 | CEx8 | CEx9 | Ex10 | Ex11 | Ex12 | Ex13 |
|---|---|---|---|---|---|---|---|---|---|---|
| PETs | | % | 0.2701 | 0.2701 | 0.2701 | 0.2701 | 0.2701 | 0.2701 | 0.2701 | 0.2701 |
| PC-1 | | % | 69.783 | 69.608 | 69.733 | 69.40 | 69.733 | 69.608 | 69.558 | 69.543 |
| PC-2 | | % | 29.227 | 29.15 | | | | | | |
| SDBS | | % | 0.02 | 0.02 | 0.02 | 0.02 | 0.02 | 0.02 | 0.02 | 0.05 |
| H$_2$O | | % | 0.3 | 0.3 | 0.3 | 0.3 | 0.3 | 0.3 | 0.3 | 0.3 |
| PC-5 | | % | | | 29.277 | 29.352 | | | | |
| Si-1 | | % | 0.3 | 0.3 | 0.3 | 0.3 | 0.3 | 0.3 | 0.4 | 0.4 |
| Si-2 | | % | 0.1 | 0.35 | 0.1 | 0.35 | 0.1 | 0.35 | 0.35 | 0.35 |
| Branched PC | | % | | | | | 29.277 | 29.152 | 29.102 | 29.087 |
| Property | | | | | | | | | | |
| MFR, 300° C., 300 sec, 1.2 kg | | g/10 min | X | 12.6 | 7.01 | 7.13 | x | 5.58 | 6.1 | 5.42 |
| T % at 2.5 mm | | % | x | X | X | X | x | 90.6 | 88.7 | 88.6 |
| Haze % at 2.5 mm | | % | x | X | X | X | x | 1.2 | 1.8 | 2 |
| V × 3.0 mm | 23° C. 48 hr | FOT | S | 46.65 | 46.35 | 57.35 | 51.35 | 32.1 | 32.95 | 29.95 | 23.8 |
| | | Drip | | 4 | 3 | 0 | 0 | 0 | 0 | 0 | 0 |
| | | Time out | | 3 | 3 | 5 | 3 | 1 | 0 | 0 | 0 |
| | | Rating | | V2 | V2 | V2 | V2 | V0 | V0 | V0 | V0 |
| | 70° C. 168 hr | FOT | S | 43.5 | 43.15 | 44.2 | 41.35 | 31.5 | 29.55 | 24.6 | 22.25 |
| | | Drip | | 0 | 0 | 0 | 0 | 0 | 0 | 0 | 0 |
| | | Time out | | 1 | 1 | 2 | 2 | 0 | 0 | 0 | 0 |
| | | Rating | | V0 | V0 | V1-V0 | V1-V0 | V0 | V0 | V0 | V0 |
| V × 2.0 mm | 23° C. 48 hr | FOT | S | x | 36.55 | X | 48.15 | 45.3 | 38.1 | 33.85 | 32.45 |
| | | Drip | | x | 7 | X | 10 | 1 | 0 | 1 | 0 |
| | | Time out | | x | 0 | X | 1 | 3 | 1 | 0 | 1 |
| | | Rating | | x | V2 | | V2 | V2 | V0 | V0 | V0 |
| | 70° C. 168 hr | FOT | S | x | 36.05 | X | 50.9 | 41.35 | 27.05 | 28.9 | 30.9 |
| | | Drip | | x | 10 | X | 8 | 0 | 0 | 0 | 0 |
| | | Time out | | x | 1 | X | 1 | 1 | 0 | 0 | 0 |
| | | Rating | | x | V2 | X | V2 | V0 | V0 | V0 | V0 |

*10 bars were used in flame testing

In summary, a polycarbonate composition comprises a linear polycarbonate, preferably wherein the linear polycarbonate comprises bisphenol A carbonate units, and more preferably wherein the linear polycarbonate is a bisphenol A polycarbonate homopolymer; a branched polycarbonate, preferably wherein the branched polycarbonate comprises bisphenol A carbonate units; sodium dodecylbenzenesulfonate (preferably 0.005 wt % to 2 wt %, based on the total weight of the polycarbonate composition); and a siloxane component comprising a linear phenyl-containing siloxane (preferably a poly(phenylmethylsiloxane) having the formula

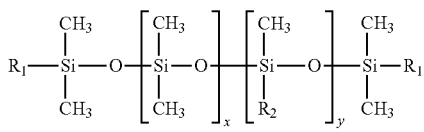

wherein $R_1$ is methyl, $R_2$ is phenyl, and x and y are molar ratios that sum to 1), a cyclic siloxane (preferably wherein the cyclic siloxane is of the formula $(R_3SiO)_y$ wherein $R_3$ is a $C_{1-18}$ monovalent hydrocarbon or a $C_{1-18}$ fluorinated hydrocarbon, and y is 3 to 12), or a combination comprising at least one of the foregoing siloxanes (preferably a combination comprising octaphenylcyclotetrasiloxane and a poly(phenylmethylsiloxane) having the formula

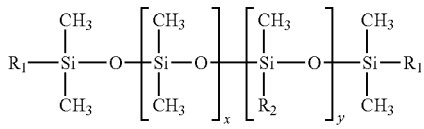

wherein $R_1$ is methyl, $R_2$ is phenyl, and x and y are molar ratios that sum to 1, most preferably 0.1 wt % to 0.8 wt % of the poly(phenylmethylsiloxane) and 0.1 wt % to 0.8 wt % octaphenylcyclotetrasiloxane, based on the total weight of the composition); wherein the composition has a flammability rating of V0 measured according to the UL 94 Vertical Burning Test at a thickness of 3 millimeters, preferably wherein the composition has a flammability rating of V0 measured according to the UV 94 Vertical Burning Test at a thickness of 2 millimeters and/or a transmission of 85% or more and a haze of 3% or less, measured according to ASTM D1003 using the color space CIE1931 (Illuminant C and a 2° observer) at a thickness of 3 mm. Optionally, the branched polycarbonate comprises moieties derived from a branching agent selected from

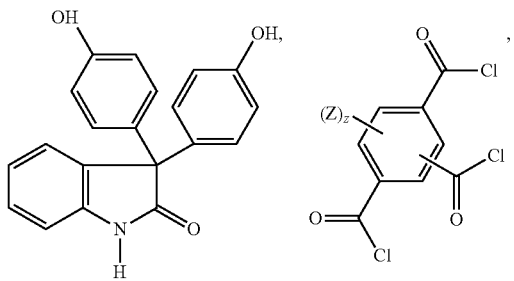

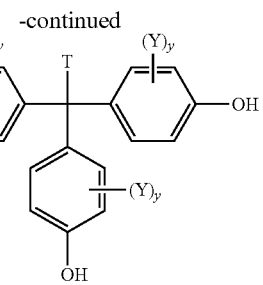

or a combination comprising at least one of the foregoing, wherein Z is a halogen, $C_{1-3}$ alkyl, $C_{1-3}$ alkoxy, $C_{7-12}$ arylalkylene, $C_{7-12}$ alkylarylene, or nitro, and z is 0 to 3, T is a $C_{1-20}$ alkyl, $C_{1-20}$ alkyleneoxy, $C_{7-12}$ arylalkyl, or $C_{7-12}$ alkylaryl, Y is a halogen, $C_{1-3}$ alkyl, $C_{1-3}$ alkoxy, $C_{7-12}$ arylalkyl, $C_{7-12}$ alkylaryl, or nitro, and s is 0 to 4, and the branching agent is present in an amount of 0.5 to 8 branching units per 100 non-branching carbonate units, and preferably wherein the branched polycarbonate has an endcap derived from a phenol, an alkyl-substituted phenol, an ester-substituted phenol, a cyano-substituted phenol, a halogen substituted phenol, or a combination comprising at least one of the foregoing phenols. Preferably in any of the foregoing embodiments the polycarbonate composition further comprises 0.025 wt. % to 5 wt. % of water and/or is free of potassium diphenylsulfone-3-sulfonate, potassium perfluorobutane-sulfonate, potassium perfluoromethane-sulfonate or a combination comprising at least one of the foregoing salts. An article comprising any of the foregling compositions can be a coffee maker, a blender, a juice extractor, or a component of a coffee maker, a juice extractor, or a blender, or a liquid crystal display.

In another embodiment, a polycarbonate composition comprises, based on the total weight of the polycarbonate composition, 50 to 90 wt. % of a linear homopolycarbonate comprising bisphenol A carbonate units; 10 to 50 wt. % of a branched polycarbonate comprising bisphenol A carbonate units; 0.01 to 2 wt % of sodium dodecylbenzenesulfonate, 0.1 to 0.8 wt % of a linear phenyl-containing siloxane, preferably poly(phenylmethylsiloxane); 0.1 to 0.8 wt % of a cyclic siloxane, preferably octaphenylcyclotetrasiloxane; and optionally 0.025 wt. % to 5 wt. % of water; wherein the composition has a flammability rating of V0 measured according to the UL 94 Vertical Burning Test at a thickness of 3 millimeters, preferably wherein the composition has a flammability rating of V0 measured according to the UV 94 Vertical Burning Test at a thickness of 2 millimeters and/or a transmission of 85% or more and a haze of 3% or less, measured according to ASTM D1003 using the color space CIE1931 (Illuminant C and a 2° observer) at a thickness of 3 mm. An article comprising any of the foregling compositions can be a coffee maker, a blender, a juice extractor, or a component of a coffee maker, a juice extractor, or a blender, or a liquid crystal display.

The singular forms "a," "an," and "the" include plural referents unless the context clearly dictates otherwise. "Or" means "and/or." The endpoints of all ranges directed to the same component or property are inclusive and independently combinable. Unless defined otherwise, technical and scientific terms used herein have the same meaning as is commonly understood by one of skill in the art to which this invention belongs.

As used herein, a "combination" is inclusive of blends, mixtures, alloys, reaction products, and the like. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refer broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a C2-6 alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; C1-6 or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All references cited herein are incorporated by reference in their entirety.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A polycarbonate composition comprising, based on the total weight of the polycarbonate composition,
    50 to less than 90 wt. % of a linear polycarbonate comprising bisphenol A carbonate units,
    10 to less than 50 wt. % of a branched polycarbonate comprising bisphenol A carbonate units,
    0.01 to 2 wt % of sodium dodecylbenzenesulfonate,
    0.1 to 0.8 wt % of a linear phenyl-containing siloxane, and
    0.1 to 0.8 wt % of a cyclic siloxane,
    wherein the polycarbonate composition is free of perfluoroalkane sulfonate alkali metal salts, perfluoroalkane sulfonate C1-C6 alkylammonium salts, and perfluoroalkane sulfonate ammonium salts, and
    wherein the polycarbonate composition has a flammability rating of V0 measured according to the UL 94 Vertical Burning Test at a thickness of 3 millimeters; and
    the polycarbonate composition has a transmission of 85% or more and a haze of 3% or less, measured according to ASTM D1003 using the color space CIE1931 (Illuminant C and a 2° observer) at a thickness of 3 mm, and
    an article molded from the polycarbonate composition with dimensions of 12.7 mm×127 mm and a thickness of 3.2 mm has no bubbles visible to unassisted eyes,
    provided that the sum of the weight percent of the linear polycarbonate, the branched polycarbonate, sodium dodecylbenzenesulfonate, linear phenyl-containing siloxane; and cyclic siloxane does not exceed 100%.

2. The polycarbonate composition of claim 1, wherein with the branched polycarbonate comprises moieties derived from a branching agent, the branching agent is present in an amount of 0.1 to 10 branching units per 100 non-branching carbonate units.

3. The polycarbonate composition of claim 1, wherein the branched polycarbonate has an endcap derived from a phenol, an alkyl-substituted phenol, an ester-substituted phenol, a cyano-substituted phenol, a halogen substituted phenol, or combinations thereof.

4. The polycarbonate composition of claim 1, wherein the cyclic siloxane is of the formula $[(R_3)_2SiO]_y$ wherein $R_3$ is a $C_{1-18}$ monovalent hydrocarbon or a $C_{1-18}$ fluorinated hydrocarbon, and y is 3 to 12.

5. The polycarbonate composition of claim 4, wherein the cyclic siloxane is octaphenylcyclotetrasiloxane.

6. The polycarbonate composition of claim 1, wherein the phenyl-containing linear siloxane comprises a poly(phenylmethylsiloxane) having the formula

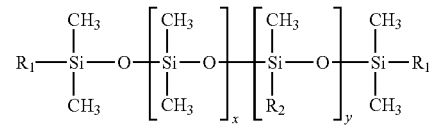

wherein $R_1$ is methyl, $R_2$ is phenyl, and x and y are molar ratios that sum to 1.

7. The polycarbonate composition of claim 1, wherein the linear phenyl-containing siloxane comprises poly(phenylmethylsiloxane) and the cyclic siloxane comprises octaphenylcyclotetrasiloxane.

8. The polycarbonate composition of claim 1, further comprising 0.025 wt. % to 5 wt. % of water.

9. The polycarbonate composition of claim 1 wherein the composition is free of impact modifiers.

10. An article of manufacture comprising a composition of claim 1.

11. The article of claim 10, wherein the article is a coffee maker, a blender, a juice extractor, or a component thereof.

12. The article of claim 10, wherein the article is a liquid crystal display.

13. A polycarbonate composition comprising, based on the total weight of the polycarbonate composition,
60 to less than 80 wt. % of a linear bisphenol A polycarbonate homopolymer,
20 to less than 40 wt. % of a branched polycarbonate comprising bisphenol A carbonate units and 3 to 10 mol %, based on the total moles of the branched polycarbonate, of a moiety derived from 1,1,1-tris(4-hydroxyphenyl)ethane;
0.01 to 1 wt % of sodium dodecylbenzenesulfonate,
0.1 to 0.8 wt % of poly(phenylmethylsiloxane), and
0.1 to 0.8 wt % of octaphenylcyclotetrasiloxane,
wherein the polycarbonate composition is free of perfluoroalkane sulfonate alkali metal salts, perfluoroalkane sulfonate C1-C6 alkylammonium salts, perfluoroalkane sulfonate ammonium salts, and impact modifiers, and
wherein the polycarbonate composition has a flammability rating of V0 measured according to the UL 94 Vertical Burning Test at a thickness of 3 millimeters;
the polycarbonate composition has a transmission of 85% or more and a haze of 3% or less, measured according to ASTM D1003 using the color space CIE1931 (Illuminant C and a 2° observer) at a thickness of 3 mm; and
an article molded from the polycarbonate composition with dimensions of 12.7 mm×127 mm and a thickness of 3.2 mm has no bubbles visible to unassisted eyes,
provided that the sum of the weight percent of the linear polycarbonate, the branched polycarbonate, sodium dodecylbenzenesulfonate, linear phenyl-containing siloxane; and cyclic siloxane does not exceed 100%.

14. The polycarbonate composition of claim 13, further comprising 0.025 wt. % to 5 wt. % of water.

* * * * *